Mar. 13, 1923.

J. H. RICE

PISTON RING EXPANDER

Filed Dec. 13, 1921

1,448,461

Patented Mar. 13, 1923.

1,448,461

UNITED STATES PATENT OFFICE.

JASON H. RICE, OF BUTTE, MONTANA.

PISTON-RING EXPANDER.

Application filed December 13, 1921. Serial No. 522,024.

*To all whom it may concern:*

Be it known that I, JASON H. RICE, a citizen of the United States, residing at Butte, in the county of Silver Bow and State of Montana, have invented certain new and useful Improvements in Piston-Ring Expanders; and I hereby declare that the following is a full, clear, and exact description thereof, reference being had to the accompanying drawings, which form part of this specification.

This invention is a novel mechanism or machine for expanding metal packing rings and placing same on pistons and the like. The machine is particularly designed for handling large heavy metallic packing rings used on pistons of locomotives, such packing rings being usually made of metal and smaller in internal diameter than the exterior diameter of the piston and split so that they can be expanded and slipped over the piston into position to engage the grooves therein, and upon entering such grooves the rings contract and are retained in position in the piston groove. These rings are heavy and stiff and by reason of their size, strength and weight of the rings and the crude method of handling them the application of these rings to the piston has heretofore been a troublesome and difficult operation. My invention provides a novel mechanism whereby such a ring can be easily expanded and when so expanded slipped over the end of the piston, and can then be released and slid along the piston until it enters the desired groove into which it will contract. By using my invention such operations can be performed very quickly and easily. This invention obviates the heretofore frequent marring chipping and breakage of such rings due to the crude means and methods heretofore used for applying such packing rings to the piston.

I will explain one practical form of mechanism embodying the invention, and illustrated in the accompanying drawings, but I do not consider the invention restricted to this particular form, and therefore have summarized in the claims the essentials of the invention and the novel features of construction and novel combinations of parts for which protection is desired.

Figure 3:
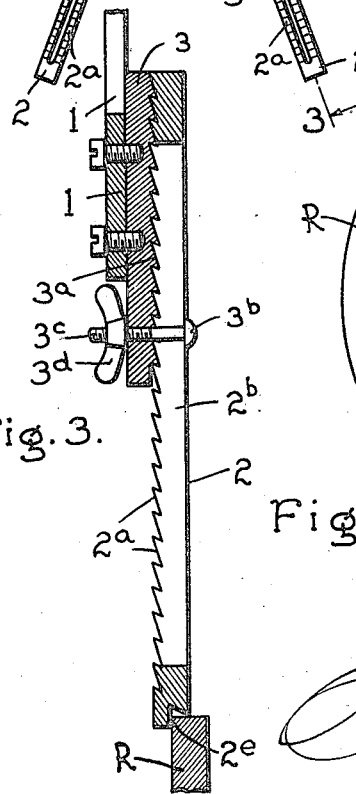
Fig. 3 is an enlarged detail sectional view on the line 3—3 Fig. 1.
Figure 4:
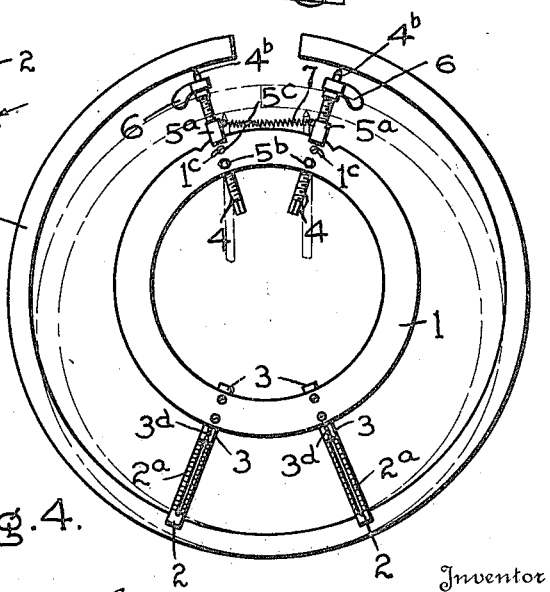
Fig. 4 is a view showing how the machine is used to expand a packing ring prior to placing same upon the piston.

The device comprises a supporting member 1 which I preferably make in the form of an annulus or ring of metal but it may be of any other suitable shape. This support is preferably provided with two radially projecting legs, or ring engaging members 2 which may be of any suitable kind and fastened to the support 1 in any suitable manner. I prefer to make the members 2 adjustable, and for this purpose in the construction shown, each member comprises a bar fastened to the support 1 and a bar 2 adjustably connected therewith. Each bar 3 as shown is preferably provided with roughened, serrated or toothed surfaces such as 3$^a$, on its outer side adapted to engage opposite similarly toothed or serrated surfaces 2$^a$ on the opposed faces of the bars 2; and each bar 2 is also preferably longitudinally slotted, as at 2$^b$, and through this slot passes a bolt 3$^c$ having a head 3$^b$, said bolt also extending through a hole in the bar 3 and secured by any suitable means, preferably by a thumb nut 3$^d$. By loosening thumb nut 3$^d$ the bar 2 can be adjusted to fix its outer end 2$^e$ at the desired distance from the center of the support 1. The bar 2 might be made adjustable in any other desired manner. The outer end of each bar 2 is preferably shaped as shown at 2$^e$ so as to engage the inner edge of the packing ring R hereinafter referred to, as indicated in Figs. 3 and 4.

Connected to the support at points preferably diametrically opposite the members 2, are two adjustable ring-engaging-members. As shown, each ring-engaging-member preferably comprises a member 5, preferably pivoted to the support, and a screw threaded rod 4 arranged practically radially of the ring 1, and tapped through threaded bores or openings in the member 5. As shown, each member 5 has a head 5$^a$ projecting beyond and across the outer edge or periphery of the support 1, and a shank 5 extending radially inward from the head and preferably pivoted to the support, as by a bolt or rivet 5$^b$, so that the head 5$^a$ can swing in the plane of the support 1 to a limited extent; the swinging movement of the head 5 being limited by suitable means, a pin or bolt $5^c$ being shown attached to the shank 5, and extending through a slot $1^c$ in the support 1, the slot $1^c$ being curved on an arc having the pivot pin $5^b$ as its center. The edge of the support 1 may be rounded or notched as shown at $1^n$ if desired, to permit the lateral swinging movement of the heads $5^a$ of the members 5 relative thereto.

The head 5 preferably projects at one side over the edge of the support 1 and has a depending lip $5^d$ at the side opposite the shank, which lip helps to guide the head in its movement, and to relieve the pin $5^b$ of lateral strain.

Figure 1:
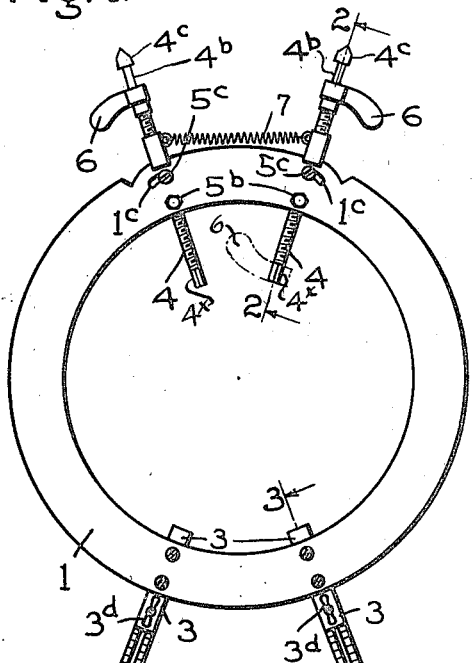
Fig. 1 is a view of the complete machine ready for engagement with a split packing ring.
Figure 2:
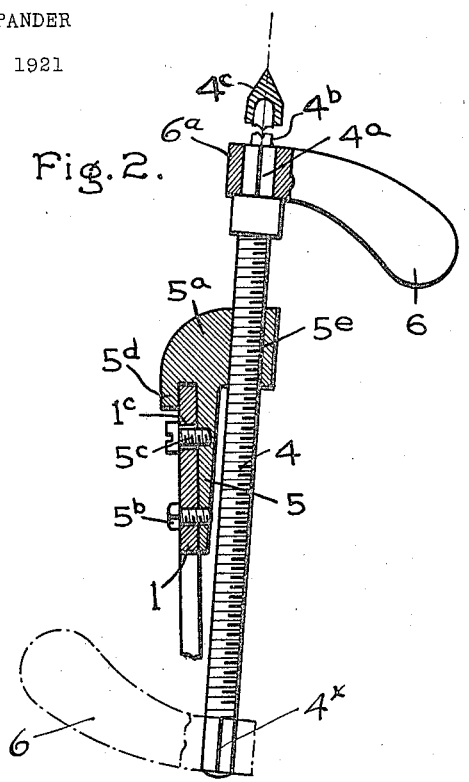
Fig. 2 is an enlarged transverse section on the line 2—2 Fig. 1.

At the side opposite the lip $5^d$ the head projects beyond the shank and in this projecting portion is formed a threaded passage $5^e$ which is approximately parallel with the outer face of the shank 5, and in which passage the threaded rod 4 is engaged. Preferably as shown in Fig. 2 the opening $5^e$ is slightly tangential to the plane of the support 1 so that the rods 4 are inclined slightly to the plane of the support, which inclination gives members 4 the proper pitch or clearness to keep them from contacting with the support 1 as they are projected or retracted.

As shown the members 4 have at their ends squared portions $4^a$ and $4^x$ and exterior to the squared end $4^a$ is a reduced cylindric portion $4^b$, having its end rounded, and adapted to engage a pointed cap $4^c$ which is adapted to engage the inner edge of the packing ring R, hereinafter referred to. The squared portions $4^a$ and $4^x$ of each member 4 are adapted to be engaged by a small wrench 6 having a head $6^a$ provided with a square opening to engage the parts $4^a$ or $4^x$. If the wrench head is slipped from the square part $4^a$ onto the round part $4^b$ the wrench can be freely turned on member 4.

Preferably two of these adjustable ring engaging devices are connected with the support in the manner above described, similar parts being similarly lettered in the drawings, and the two adjacent heads $5^a$ are connected by a helical contractile spring 7 which normally tends to draw the heads $5^a$ (and consequently the ends $4^c$ of the adjustable ring engaging members) toward each other.

In using the device, as indicated in Fig. 4, the members 4 should be retracted and the members 2 adjusted so that the entire mechanism may be placed within a packing ring R (see Fig. 4) with the ends $2^e$ of the members 2 engaging the ring at a point diametrically opposite the split in the ring, and the outer pointed ends of the cap members $4^c$ engaging the ring at opposite sides of the split therein. Then the members 4 are similarly screwed outward, by the wrenches 6 or other suitable means, until the mechanism is clamped in the ring; and then the screw members 4 are forced further outward thereby spreading the packing ring, the ends thereof separating (as indicated in Fig. 4) until the internal diameter of the ring becomes greater than that of the piston to which the ring is to be applied. Then the mechanism is placed against the end of the piston so that the expanded ring thereon slips over the end of the piston; then the screw members 4 are retracted allowing the ring R to contract until it binds upon the piston and after further retraction of the screw members 4 the mechanism can be withdrawn leaving the ring upon the piston, on which it can be pushed sidewise into the usual annular groove.

Any desired number of packing rings may be successively easily and quickly applied to the piston in this manner. If it is desired to move a ring past a groove in the piston such groove can be covered by a removable annular band or closed by removable fillers while the ring is being slipped thereover, then such band or fillers can be removed.

The ring engaging members 4 being mounted on pivoted supports are capable of a swinging movement in the plane of the support and automatically accommodate themselves to the expansive movement of the ring as they are forced outward. As soon as they are disengaged from the ring the spring 7 immediately returns the ring engaging members to normal position ready for reengagement with another ring. On account of the position of the parts it may be impracticable or inconvenient to swing the wrenches 6 in complete circles, or turn them continuously around with the screw members 4; and therefore when operating the expander with the small wrenches 6 if engaged with the part $4^b$ of the screws such wrenches can be turned as far as they can in one direction while engaged with the squared portions $4^a$ of the screw members, then the wrenches can be slipped up into engagement with the round portions $4^b$ of the members and then freely returned to first position and then reengaged with the squared portions. In this manner the screw members can be very easily operated by the wrenches. The screws however can in any case be operated by applying the wrench 6 to the lower ends $4^x$ of the screws permitting greater speed of expansion on very heavy packing and also permitting the use of a larger wrench when necessary.

The ends $4^b$ of screws 4 may be pointed themselves to engage the rings without the use of the caps $4^c$, but I prefer to use the cap $4^c$ which remains stationary, while the original screw head revolves within it, thereby leaving the packing free from indentations, bored therein by a sharp point.

The pitch of the screw members provides proper clearance between the support and the end of the piston when applying a ring thereto, and also permits the thumb screws or wrenches 6 to be easily operated on the screw rods. While I prefer to make the members 2 adjustable it is obvious that if the machine is to be used only for a certain size ring, or certain limited sizes of rings, it will be unnecessary to make them adjustable.

The outer ends of the members 2 are formed, as preferably indicated at 2ª so that they will bind against the inner edge of the ring and not slip or slide thereon when the ring is expanded.

This machine enables the heaviest metal packing rings to be quickly and easily applied to pistons or the like with very little labor; it avoids the large percentage of breakage of heavy packing rings heretofore caused by the crude methods of applying such rings by means of wedges or other implements which cause uneven expansion of the rings and often results in breakage. While the machine is particularly designed for use in applying packing rings of large size, it is also adapted for use in applying packing rings of smaller sizes. The machine will expand the rings uniformly, avoid fracture, and distortion caused by uneven expansion, and enables rings to be easily placed on any piston head whereon hard stiff split packing rings are employed.

The machine may be made in smaller sizes for smaller rings, and various modifications can be made in the form and construction of the parts within the scope of the invention, therefore I do not consider the invention restricted to the particular construction of the parts shown.

What I claim is:

1. A mechanism for expanding packing rings, comprising a support having a ring engaging member, a pair of radially adjustable ring engaging members connected to the support adapted to engage the ring at opposite sides of the split therein, to expand the ring, substantially as described.

2. A mechanism for expanding packing rings, comprising a support, a pair of radially projecting ring engaging members attached to the support, a pair of adjustable ring engaging members connected to the support and adapted to engage the ring at opposite sides of the split therein and expand the ring, substantially as described.

3. A mechanism for expanding packing rings, comprising a support, a pair of radially projecting ring engaging members attached to the support, a pair of adjustable ring engaging screw members connected to the support diametrically opposite the first members and adapted to engage the ring at opposite sides of the split therein, to expand the ring, substantially as described.

4. A mechanism for expanding packing rings, comprising a support having a projecting ring engaging member, a pair of adjustable ring engaging members pivotally connected to the support adapted to engage the ring at opposite sides of the split therein, and means for causing said adjustable members to expand the ring.

5. A mechanism for expanding packing rings, comprising a support, a pair of adjustable radially projecting ring engaging members attached to the support, a pair of adjustable ring engaging members pivotally connected to the support and adapted to engage the ring at opposite sides of the split therein, and means for operating said adjustable members so as to expand the ring.

6. A mechanism for expanding packing rings; comprising a support, a pair of adjustable radially projecting ring engaging members attached to the support, a pair of adjustable ring engaging screw members pivotally connected to the support diametrically opposite the first members and adapted to engage the ring at opposite sides of the split therein, and means for operating said screw members so as to expand the ring.

7. Mechanism for applying split piston rings to pistons comprising a support, having a projecting member adapted to engage the inner periphery of a split ring, a pair of adjustable ring engaging members adapted to engage the inner edge of the ring at opposite sides of the split therein, said members being pivotally mounted on the support so as to be movable in a plane approximately parallel with the plane of the support.

8. Mechanism for applying split piston rings to pistons comprising a support having a radially projecting member adapted to engage the inner periphery of the split ring, a pair of adjustable screw threaded members diametrically opposite the first member adapted to engage the inner edge of the ring at opposite sides of the split therein, and members supporting said screw threaded members and pivoted to the support so as to be movable in a plane approximately parallel to the plane of the support.

9. Mechanism for applying split piston rings to pistons comprising a support, a pair of radially projecting members connected to the support adapted to engage the inner periphery of a split ring, a pair of radially adjustable ring engaging members adapted to engage the inner edge of the ring at opposite sides of the split therein, said members being pivotally mounted on the support so as to be movable in a plane approximately parallel with the plane of the support.

10. Mechanism for applying split piston rings to pistons: comprising an annular support, a pair of radially projecting members connected to the support and adapted to engage the inner periphery of the split ring, a pair of radially adjustable screw threaded ring engaging members diametrically opposite the first members and adapted to engage the inner edge of the ring at opposite sides of the split therein, and members supporting said ring engaging members and pivoted to the support so as to be movable in a plane approximately parallel to the plane of the support.

11. A mechanism for expanding split piston rings; comprising a support having a ring engaging member projecting radially therefrom, a pair of members pivotally connected to the support diametrically opposite the first member and capable of lateral movement in a plane approximately parallel with the plane of the support, a ring engaging member connected with each of said pivoted members, and adapted to project radially of the support and engage the ring at opposite sides of the split therein, and means for projecting said ring engaging members radially to expand the ring.

12. A mechanism for expanding split piston rings; comprising a support, a pair of adjustable ring engaging members connected with the support projecting radially therefrom, a pair of members pivotally connected to the support diametrically opposite the first members and capable of lateral movement in a plane parallel with the supports, a screw threaded ring engaging member tapped through each of said pivoted members and projecting radially of the support and adapted to engage the ring at opposite sides of the split therein, and means for causing said ring engaging members to expand the ring.

13. In a ring expanding mechanism as set forth in claim 1, a member having a shank pivoted to the support and a head provided with a screw threaded bore extending approximately radially of the support, the screw threaded ring engaging member being tapped through said bore.

14. In a ring expanding mechanism as set forth in claim 1, a member having a shank pivoted to the support and a head provided with a screw threaded bore extending approximately radially of the support, said head having a lip loosely engaging the support at the side opposite the screw, the screw threaded ring engaging member being tapped through the bore in said head.

15. In a ring expanding mechanism as set forth in claim 1, a pair of members each having a shank pivoted to the support and a head provided with a screw threaded bore arranged approximately radially of the support, the screw threaded ring engaging members being tapped through the bores of said heads; and means for limiting the swinging movements of said pivoted members.

16. In a ring expander as set forth in claim 1, a pair of members each having a shank pivoted to the support and a head provided with a screw threaded bore arranged approximately radially of the support, the screw threaded ring engaging members being tapped through the bores of said heads; means for limiting the swinging movement of said pivoted members, and a spring for normally drawing them toward each other.

17. In a ring expanding mechanism as set forth in claim 1, the ring engaging member comprising a screw threaded rod having a squared portion above its threaded portion for the engagement of a wrench and a reduced cylindric portion above the squared portion to permit the wrench to be turned freely on the rod while the member is engaged with the ring.

18. In a piston ring expanding mechanism as set forth in claim 1, the first ring engaging member comprising a bar attached to the support having a roughened face, and an adjustable bar having a roughened face opposed to the rough face of the bar attached to the support, and means for clamping the bars together, substantially as described.

19. In a piston ring expanding mechanism as set forth in claim 1, the first ring engaging member comprising a serrated bar attached to the support and a slotted bar having a serrated surface opposed to the surface on the member attached to the support, said latter bar being longitudinally slotted and a bolt transfixing the bars and engaging the slot for clamping the bars together, substantially as described.

20. In a ring expanding mechanism as set forth in claim 5, a member having a shank pivoted to the support and a head provided with a screw threaded bore extending approximately radially of the support, the screw threaded ring engaging member being tapped through said bore.

21. In a ring expanding mechanism as set forth in claim 5, a member having a shank pivoted to the support and a head provided with a screw threaded bore extending approximately radially of the support, said head having a lip loosely engaging the support at the side opposite the screw, the screw threaded ring engaging member being tapped through the bore in said head.

22. In a ring expanding mechanism as set forth in claim 5, a pair of members each having a shank pivoted to the support and a head provided with a screw threaded bore arranged approximately radially of the support, the screw threaded ring engaging members being tapped through the bores of said heads; and means for limiting the swinging movements of said pivoted members.

23. In a ring expander as set forth in claim 5, a pair of members each having a shank pivoted to the support and a head provided with a screw threaded bore arranged approximately radially of the support, the screw threaded ring engaging members being tapped through the bores of said heads; means for limiting the swinging movement of said pivoted members, and a spring for normally drawing them toward each other.

24. In a ring expanding mechanism as set forth in claim 5, the ring engaging member comprising a screw threaded rod having a squared portion above its threaded portion for the engagement of a wrench and a reduced cylindric portion above the squared portion to permit the wrench to be turned freely on the rod while the member is engaged with the ring.

25. In a piston ring expanding mechanism as set forth in claim 5, the first ring engaging member comprising a bar attached to the support having a roughened face, and an adjustable bar having a roughened face opposed to the rough face of the bar attached to the support, and means for clamping the bars together, substantially as described.

26. In a piston ring expanding mechanism as set forth in claim 5, the first ring engaging member comprising a serrated bar attached to the support, and a slotted bar having a serrated surface opposed to the surface on the member attached to the support, said latter bar being longitudinally slotted, and a bolt transfixing the bars and engaging the slot for clamping the bars together, substantially as described.

In testimony that I claim the foregoing as my own I affix my signature.

JASON H. RICE.